Sept. 24, 1946.　　　　I. L. CHURCH　　　　2,408,197
SAW-TOOTH SETTING DEVICE
Filed July 13, 1945
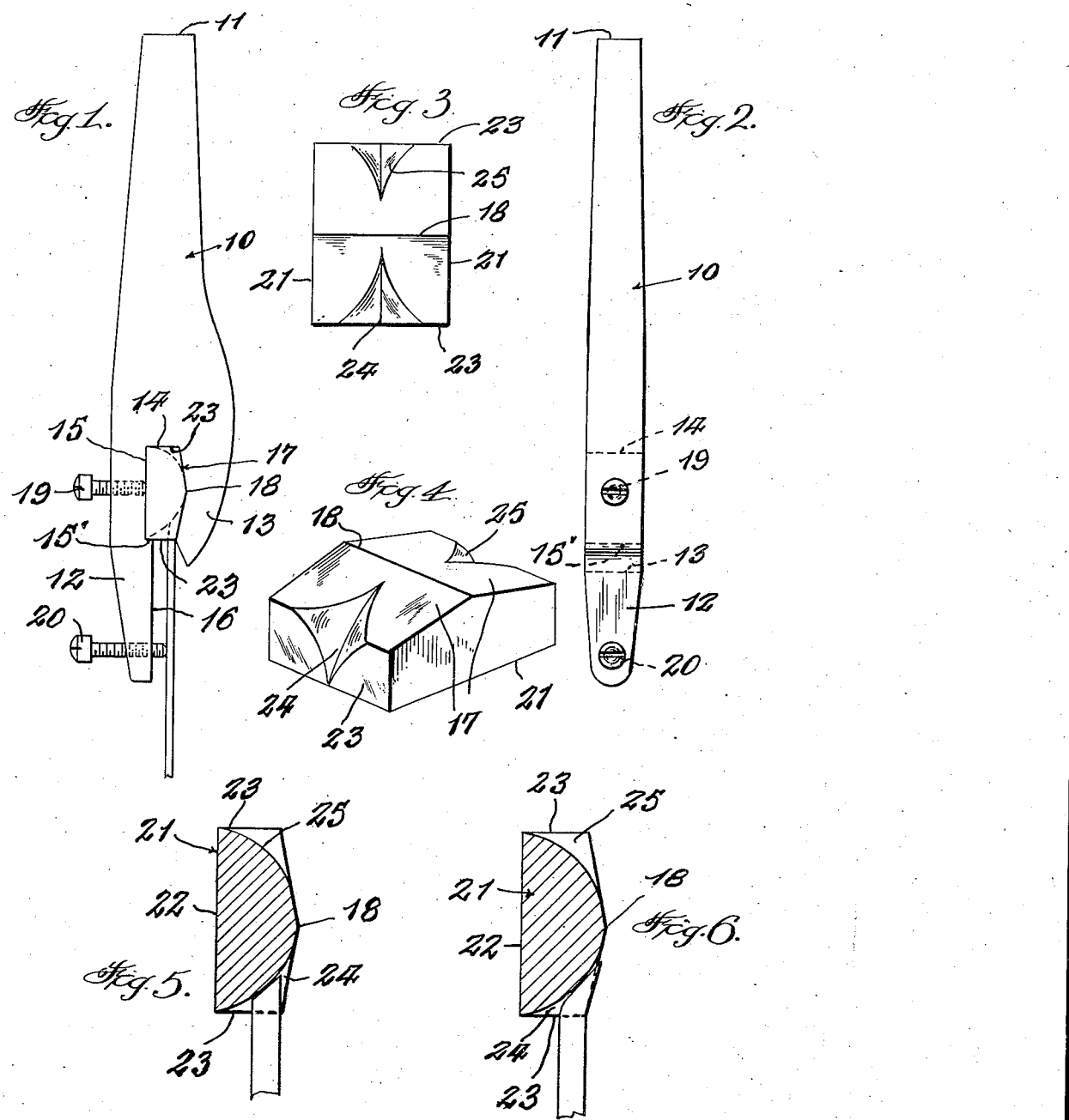
INVENTOR.
Ira L. Church,
BY Christian R. Nielsen
ATTORNEY Patented Sept. 24, 1946

2,408,197

UNITED STATES PATENT OFFICE 2,408,197

SAW-TOOTH SETTING DEVICE

Ira L. Church, Reed City, Mich.

Application July 13, 1945, Serial No. 604,890

1 Claim. (Cl. 76—72)

This invention relates to a saw tooth setting device and it consists in the constructions, arrangements and combinations herein described and claimed.

It is the cardinal object of the invention to provide a saw tooth setting device which will insure a perfect set of the teeth of a saw, regardless of the thickness of a saw tooth, this being accomplished by supporting the tool upon the saw body in a position opposite to the position occupied by a tooth and setting anvil, this arrangement providing an impact at or very close to the center of a tooth.

It is also an object of the invention to provide a novel construction of anvil insuring a centralized impact upon a tooth being set.

Additional objects, advantages and features of invention will be apparent from the following description and accompanying drawing, wherein Figure 1 is a side elevation of the tool in operative position upon a saw blade.

Figure 2 is a side elevation of the saw setting tool.

Figure 3 is a top plan view of the anvil.

Figure 4 is a perspective view thereof.

Figure 5 is a cross section of the anvil engaged with a tooth of a saw preliminary to setting of the tooth.

Figure 6 illustrates the tooth after setting thereof.

There have been many saw setting devices prior to my invention, and I am especially familiar with a construction patented to Milan Cowles, No. 280,138 issued June 26, 1883. In this patent, a supporting leg of the tool is adapted to engage the saw body while a tooth of the saw engages an anvil at the same side so that in operation of the tool, unless the tool is held absolutely in a vertical line with the tooth, a blow on the upper end of the tool, which is required to set the tooth, a tendency for the tool to cant itself toward the unsupported side of the tool is inherent, causing a too great bend to the tooth and in some instances, actual breakage of the tooth will occur. Also, where thickness of the teeth vary, the above difficulty is still further aggravated since the teeth do not occupy the same position on the anvil.

In my construction of tool the above difficulties are overcome by supporting the saw body at one side and setting the tooth between the anvil and a short leg of the tool in opposed relation to the support for the saw body.

Referring to the drawing, there is shown in Figures 1 and 2, a saw setting tool 10, consisting of a main body of elongated form, the upper end 11 of which is formed to receive a blow from a hammer or the like, which is well understood in the art. The opposite end of the tool is bifurcated to define a long leg 12 and a short leg 13. The bight 14 of the tool is square and horizontally disposed, the upper inside wall 15 of the leg 12 extending at right angles thereto, but recessed with respect to the lower wall 16 of the leg 12, as at 15'. The inside wall 17 of the short leg 13 is convergent, forming an apex 18 in horizontal alignment with a set screw 19 threadedly engaged in the long leg 12. The lower end of the long leg 12 has threadedly engaged therein a set screw 20 adapted to engage the side of a saw body, as will be explained.

The anvil or die 21 is substantially rectangular as seen in plan view, having a flat base 22 and lateral side walls 23, the anvil being of such dimensions as to present the walls 23 within the bight 14 and the recess 15', while the apex 18 of the anvil will seat within the convergent portion 17 of the short leg 13. The anvil is slidably engaged within the tool and the set screw 19 is employed to secure the anvil therewithin.

The anvil 21 is formed with a pair of substantially V-shaped notches 24 and 25, the former having a larger swaging surface than the latter to accommodate large teeth. The notches are formed in the side walls 23 of the anvil, extending upwardly upon the convergent walls 17 of the anvil a distance, the wall surfaces of the notches being slightly arcuate.

In use, with the anvil in position within the tool, a notch 24 or 25, as the case may be, is presented upon the point of a tooth, the set screw 20 being adjusted to properly center the tooth. It should be noted that the notch extends in the direction of the short leg 13 in opposed relation to the set screw 20. Thus the tooth will be maintained in an adjusted position so that impact upon the end 11 of the tool will impart a straight downward thrust upon the tooth without liability of tilting of the tool laterally, the tooth being uniformly swaged due to the curvature of the notch.

It will be noted that by forming the anvil with the apex 18 in alignment with the set screw 19, and forming the inside face of the short leg in complemental relation to the apex a very secure retention of the anvil is provided, yet the anvil may be readily released for reversal of the anvil when required.

While I have shown and specifically described the invention, this is by way of illustration only, and I consider as my own all such modifications in construction as fairly fall within the scope of the appended claim.

I claim:

A saw tooth setting tool comprising an elongated body having an end for receiving the blow of a hammer and a bifurcated opposite end defining a long leg and a short leg, said long leg having a recessed part upon its inner face adjacent the bight of said furcation, the inner face of said short leg having converging walls opposed to said recessed part of the long leg, an anvil seated in said recessed part and having an apex portion complemental to the juncture of said converging walls, said anvil having a V-shaped notch formed in a pair of opposed walls thereof, said notches extending in the direction of the short leg, a set screw in the long leg adapted to impinge upon the base wall of the anvil in alignment with the apex of the anvil and the juncture of said converging walls and a second set screw in said long leg adjacent the lower end thereof for centering of a saw body with respect to the notch of the anvil, said last named set screw being in opposed relation to the line of travel of a saw tooth under setting action.

IRA L. CHURCH.